United States Patent
Liao et al.

(10) Patent No.: US 9,880,804 B1
(45) Date of Patent: Jan. 30, 2018

(54) METHOD OF AUTOMATICALLY ADJUSTING SOUND OUTPUT AND ELECTRONIC DEVICE

(71) Applicant: Unlimiter MFA Co., Ltd., Eden Island (SC)

(72) Inventors: Ho-Hsin Liao, Taipei (TW); Kuan-Li Chao, Taipei (TW); Neo Bob Chih-Yung Young, Taipei (TW); Kuo-Ping Yang, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 0 days.

(21) Appl. No.: 15/366,022

(22) Filed: Dec. 1, 2016

(30) Foreign Application Priority Data

Sep. 23, 2016  (TW) .............................. 105130911 A

(51) Int. Cl.
*G06F 3/16* (2006.01)
*G10L 15/04* (2013.01)
*G10L 15/22* (2006.01)

(52) U.S. Cl.
CPC .............. *G06F 3/165* (2013.01); *G10L 15/04* (2013.01); *G10L 15/22* (2013.01)

(58) Field of Classification Search
CPC .... G06F 3/167; G06F 17/30867; G06F 3/165; G06F 17/2785; G10L 15/22; G10L 15/02; G10L 15/197; G10L 25/51; G10L 15/265; G10L 17/22; G10L 2015/088; G10L 25/48; G10L 2015/228

See application file for complete search history.

(56) References Cited

U.S. PATENT DOCUMENTS

| | | | |
|---|---|---|---|
| 6,868,385 B1* | 3/2005 | Gerson | G10L 15/30 370/468 |
| 9,311,933 B2 | 4/2016 | Young et al. | |
| 9,313,582 B2* | 4/2016 | Chao | H04R 25/353 |
| 9,318,107 B1* | 4/2016 | Sharifi | G10L 15/08 |
| 9,514,752 B2* | 12/2016 | Sharifi | G10L 15/08 |
| 2005/0190903 A1* | 9/2005 | Viikki | H04M 19/041 379/142.01 |
| 2005/0192805 A1* | 9/2005 | Kudoh | G10L 15/04 704/248 |
| 2006/0109983 A1* | 5/2006 | Young | H04K 3/43 380/252 |
| 2007/0071206 A1* | 3/2007 | Gainsboro | H04M 3/2281 379/168 |
| 2007/0213092 A1* | 9/2007 | Geelen | G08G 1/0969 455/556.1 |
| 2009/0061837 A1* | 3/2009 | Chaudhri | G06F 3/0481 455/418 |
| 2011/0182283 A1* | 7/2011 | Van Buren | H04M 3/4936 370/352 |
| 2012/0253823 A1* | 10/2012 | Schalk | G08G 1/096877 704/270.1 |

(Continued)

*Primary Examiner* — Mohammad Islam
(74) *Attorney, Agent, or Firm* — Bacon & Thomas, PLLC

(57) ABSTRACT

A method of automatically adjusting sound output is disclosed. The method includes the following the steps of: receiving a sound message via a microphone; analyzing the sound message to determine whether the sound message is a voice message; controlling a sound player to stop playing sound or to lower volume of the sound if the sound message is a voice message.

4 Claims, 3 Drawing Sheets

(56) References Cited

U.S. PATENT DOCUMENTS

| | | | |
|---|---|---|---|
| 2013/0339031 A1* | 12/2013 | Yoon | G10L 15/22 704/275 |
| 2014/0172990 A1* | 6/2014 | Wan | H04W 4/025 709/206 |
| 2014/0358530 A1* | 12/2014 | Young | G10L 21/0364 704/207 |
| 2015/0023512 A1* | 1/2015 | Shennib | H04R 25/70 381/60 |
| 2017/0025124 A1* | 1/2017 | Mixter | G10L 15/32 |
| 2017/0164124 A1* | 6/2017 | Shennib | H04R 25/353 |

* cited by examiner

METHOD OF AUTOMATICALLY ADJUSTING SOUND OUTPUT AND ELECTRONIC DEVICE

BACKGROUND OF THE INVENTION

1. Field of the Invention

The present invention relates to a method of automatically adjusting sound output, particularly to a method of automatically adjusting sound output after receiving a human voice message.

2. Description of the Related Art

As mobile devices become popular, more and more people are accustomed to listening to music or watching videos on mobile devices such as cell phones or tablets. To avoid affecting others when listening to music or watching videos on such devices in public places, people use headphones to output the sound. However, because the headset is placed close to the ears when being used, people cannot easily hear what a nearby person says, so they often need to remove the headset or pause the music or video in order to communicate clearly with others, which is quite inconvenient.

Therefore, it is necessary to develop a solution to the problem.

SUMMARY OF THE INVENTION

It is a major objective of the present invention to provide a method of automatically adjusting sound output after receiving a voice message and an electronic device capable of implementing the method.

To achieve the objective described above, the method of automatically adjusting sound output of the present invention is applicable to an electronic device which includes a sound player, a microphone, and an audio signal processing unit. The method of automatically adjusting sound output of the present invention includes the following steps: receiving a sound message via the microphone; analyzing the sound message to determine whether the sound message is a voice message, performed by the audio signal processing unit; and controlling a sound player to stop playing sound or to lower the volume of the sound, performed by the audio signal processing unit.

The present invention further provides an electronic device capable of implementing the method of automatically adjusting sound output described above. The electronic device includes a sound player, a microphone, and an audio signal processing unit. The microphone is used for receiving a sound message. The audio signal processing unit is electrically connected to the sound player and the microphone and includes a sound analysis module and a control module. The sound analysis module is used for analyzing a sound message to determine whether the sound message is a voice message. The control module is signally connected to the sound analysis module and used for controlling the sound player to stop playing sound or to lower the volume of the sound.

DETAILED DESCRIPTION OF THE PREFERRED EMBODIMENT

Hereafter, the technical content of the present invention will be better understood with reference to the preferred embodiment.

Figure 1:
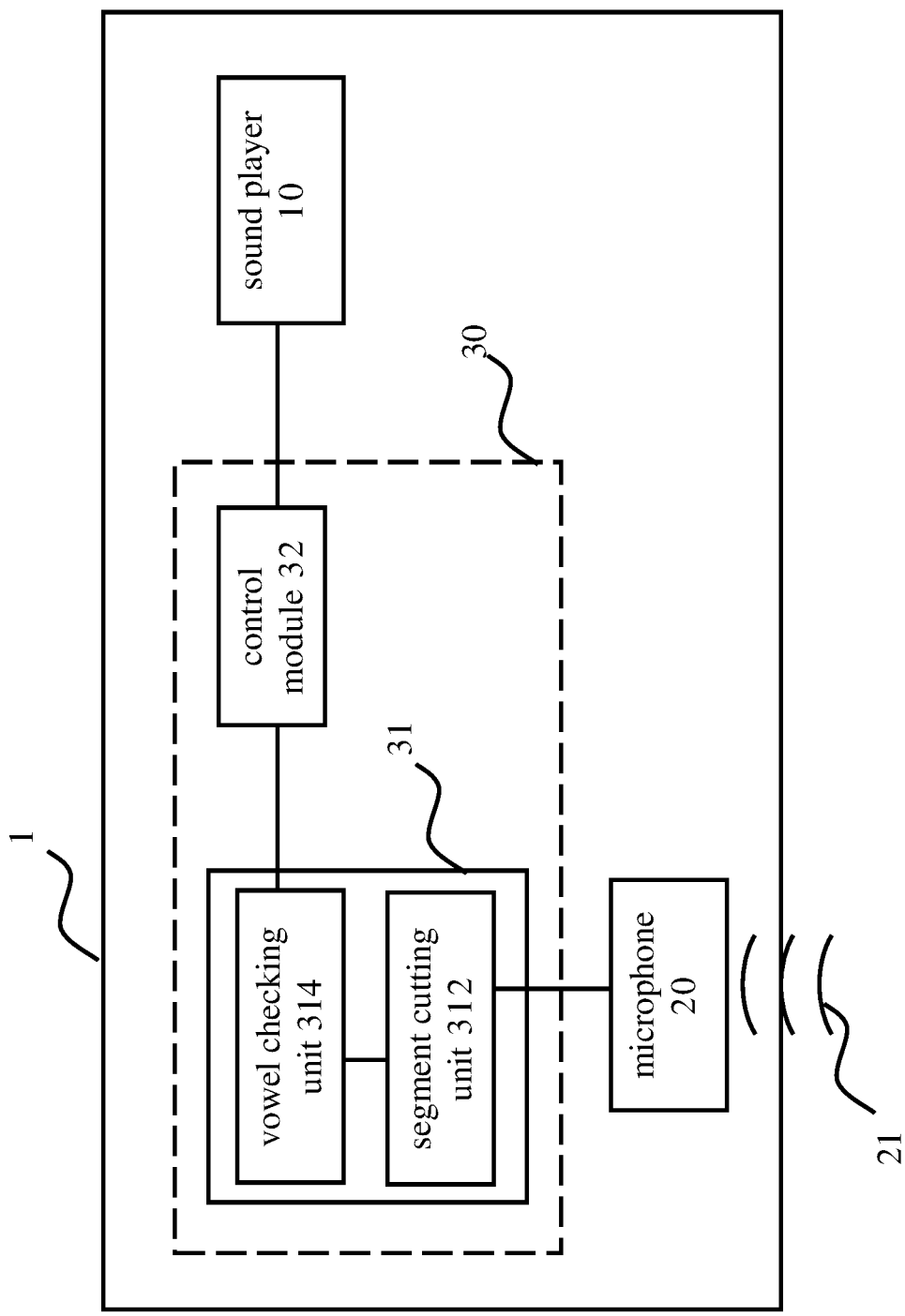
FIG. 1 is an architecture diagram of an electronic device according to the present invention.

Hereafter, please first refer to FIG. 1. FIG. 1 presents an architecture diagram of an electronic device according to the present invention.

As shown in FIG. 1, in an embodiment of the present invention, an electronic device 1 of the present invention includes a sound player 10, a microphone 20, and an audio signal processing unit 30. In the preferred embodiment of the present invention, the electronic device 1 is a smart phone, but the present invention is not limited thereto. It may also be a tablet, notebook, or other electronic product with sound playback and processing functions.

In an embodiment of the present invention, the sound player 10 may be headphones used for playing sound.

In an embodiment of the present invention, the microphone 20 is used for receiving a sound message 21 outside the electronic device 1.

In an embodiment of the present invention, the audio signal processing unit 30 may be an audio processing chip electrically connected to the sound player 10 and the microphone 20. The audio signal processing unit 30 can process input sound signals generated by the microphone 20 or other components (e.g., a processor) to generate an output sound signal; after the output sound signal is transmitted to the sound player 10 or other sound playback device (e.g., a speaker), the sound player 10 or other sound playing device can play sound in accordance with the output sound signal. Since the codec of the audio signal is a conventional technique, its principles and implementation are well known to those skilled in the art and are not the key of patentability of the present invention. Thus, it will not be described in detail hereinafter.

In an embodiment of the present invention, the audio signal processing unit 30 includes a sound analysis module 31 and a control module 32, wherein the control module 32 is signally connected to the sound analysis module 31. It should be noted here that the sound analysis module 31 and the control module 32 may not only be configured as hardware devices, software programs, firmware, or combinations thereof, but may be configured as a circuit loop or other suitable types. Also, each of the modules can be configured individually or in combination. Additionally, the preferred embodiment of the present invention described here is only illustrative. To avoid redundancy, not all the possible combinations of changes are documented in detail. However, it shall be understood by those skilled in the art that each of the modules or elements described above may not be necessary. For the implementation of the present invention, the present invention may also contain other detailed, conventional modules or elements. Each module or component can be omitted or modified depending on design requirements. Other modules or elements may not necessarily exist between any two of the modules.

In an embodiment of the present invention, the sound analysis module 31 is used for analyzing a sound message 21 received by the microphone 20 to determine whether the sound message 21 is a voice message (i.e., a human voice). In a specific embodiment, the sound analysis module 31 includes a segment cutting unit 312 and a vowel checking unit 314, wherein the segment cutting unit 312 is used for cutting the sound message 21 into a plurality of sound segments and the vowel checking unit 314 is used for checking whether one of the plurality of sound segments is a vowel segment and for detecting that the sound message 21 is a voice message when it is determined that one of the sound segments is a vowel segment. The method of determining vowel segments is a conventional technique. The specific principle and the implementation of the method are described in U.S. Pat. No. 9,311,933B2 (METHOD OF PROCESSING A VOICE SEGMENT AND HEARING AID); e.g., checking whether a voice segment has a harmonic phenomenon. It should be noted that the method described in the literature is only one of the existing vowel detection methods and that the method of automatically adjusting sound output of the present invention is not limited to the method of implementing vowel detection. It should be understood that any method of recognizing consonants and vowels may be utilized in the present invention.

In an embodiment of the present invention, the control module 32 is used for controlling the sound player 10 to stop playing sound or to lower the volume of the sound played by the sound player 10 when the sound analysis module 31 determines that the sound message 21 is a voice message. Also, once the sound player 10 stops playing the sound, the control module 32 also controls the sound player 21 to play the sound message 21 received by the microphone 20.

Figure 2:
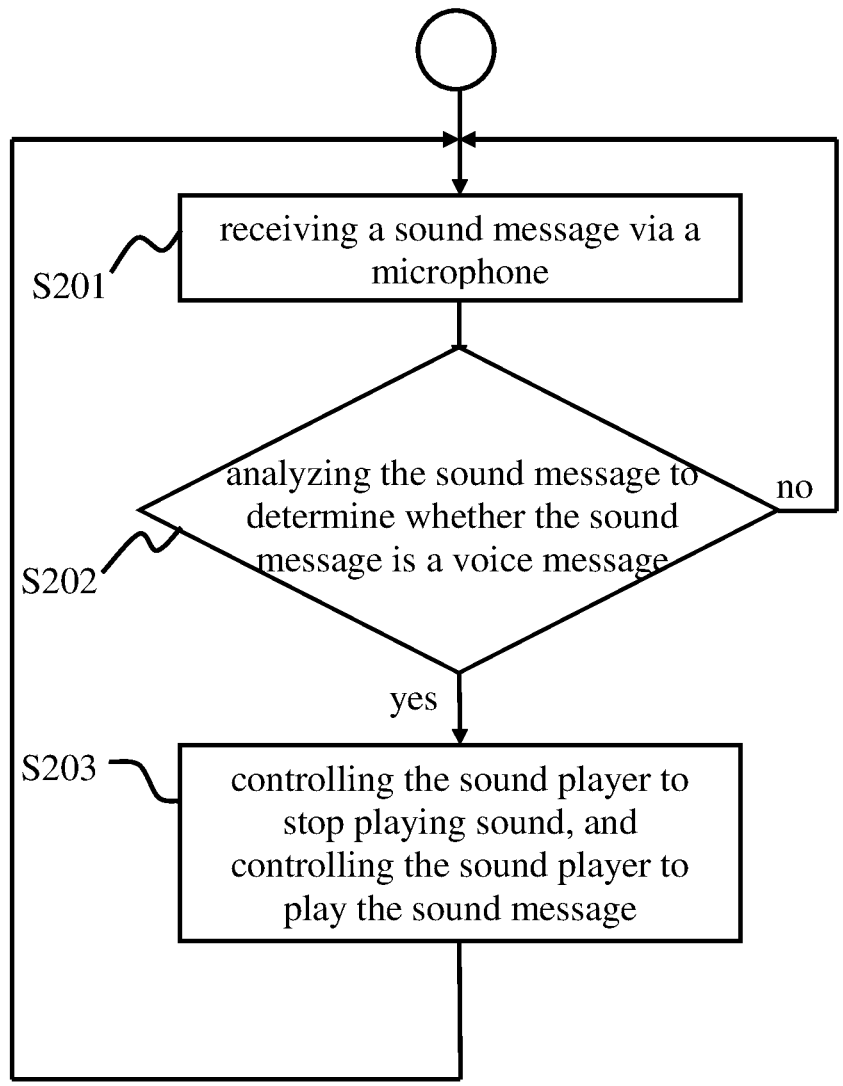
FIG. 2 is a flowchart of a method of automatically adjusting sound output according to the present invention.
Figure 3:
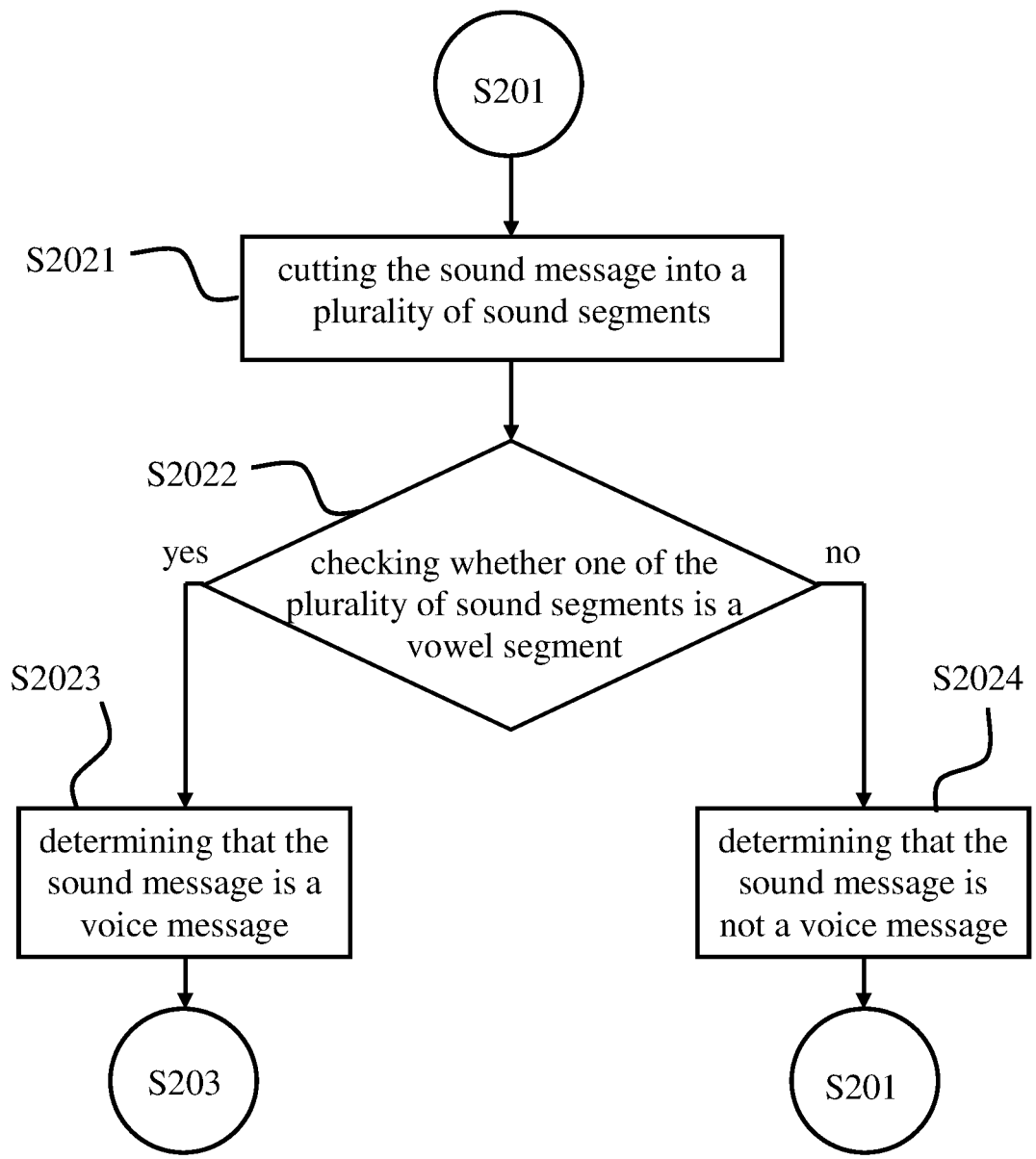
FIG. 3 shows Step S202 of FIG. 2 according to one embodiment of the present invention.

Please refer to FIGS. 1 to 3. FIG. 2 is a flowchart showing the method of automatically adjusting sound output according to the present invention, and FIG. 3 shows Step S202 in FIG. 2 according to one embodiment of the present invention. It should be noted that although the following description uses the aforementioned electronic device 1 as an example to interpret the method of automatically adjusting sound output disclosed in the present invention, the method of automatically adjusting sound output in the present invention is not limited to the method applied to the electronic device 1 described above.

First, in Step S201: Receiving a sound message via a microphone.

The method of automatically adjusting sound output disclosed in the present invention is used for automatically adjusting sound output of the electronic device 1 after the electronic device 1 receives a voice message. Thus, the first step in the method is to use a microphone 20 of an electronic device 1 to receive a sound message 21 outside the electronic device 1.

In Step S202: analyzing the sound message to determine whether the sound message is a voice message.

After Step S201 is completed, the audio signal processing unit 30 of the electronic device 1 then analyzes the sound message 21 received by the microphone 20 to determine whether the sound message 21 is a voice message. Please refer to FIG. 3 for implementation of Step S202 in one of the embodiments of the present invention. The first step in the embodiment is cutting the received sound message 21 into a plurality of sound segments (i.e., Step S2021) and then checking whether one of the plurality of sound segments is a vowel segment (i.e., Step S2022). If it is determined that the sound segment is not a vowel segment, the sound message 21 is determined not to be a voice message by the audio signal processing unit 30 (i.e., Step S2024). Conversely, if it is determined that at least one of the sound segments is a vowel segment, the sound message is determined to be a voice message by the audio signal processing unit 30 (i.e., Step S2023), and then Step S203 is performed.

In Step S203: controlling the sound player to stop playing sound, and controlling the sound player to play the sound message.

In an embodiment of the present invention, after it is determined that the sound message 21 received by the microphone 20 is a voice message, the control module 32 of the audio signal processing unit 30 controls the sound player 10 to stop playing sound and controls the sound player 10 to play the sound message 21 received by the microphone 20. For example, assume that a user is listening to music through the sound device 10 of the electronic device 1; at this point, if a person talks to the user, the sound player 10 will stop playing music and play the words of the person after the above method is performed.

As described above, the objective, means, and efficiency of the present invention are all different from conventional characteristics in the prior art. It will be appreciated if the committee can review and grant a patent to benefit society. However, it should be noted that the described embodiments are only for illustrative and exemplary purposes and that various changes and modifications may be made to the described embodiments without departing from the scope of the invention as disposed by the appended claims.

What is claimed is:

1. A method of automatically adjusting sound output, which is applicable to an electronic device, the electronic device comprising a sound player, a microphone, and an audio signal processing unit, comprising the steps of: receiving a sound message via a microphone; analyzing the sound message to determine whether the sound message is a voice message, performed by the audio signal processing unit; wherein the step of determining whether the sound message is a voice message comprises: cutting the sound message into a plurality of sound segments, performed by the audio signal processing unit; checking whether one of the plurality of sound segments is a vowel segment, performed by the audio signal processing unit; if yes, determining that the sound message is a voice message, performed by the audio signal processing unit; and If no, determining that the sound message is not a voice message, performed by the audio signal processing unit and if yes, controlling the sound player to stop playing sound or to lower the volume of the sound if the sound message is a voice message, performed by the audio signal processing unit.

2. The method as claimed in claim 1, wherein after controlling the sound player to stop playing sound, the method further comprises the following step of:
controlling the sound player to play the sound message, performed by the audio signal processing unit.

3. An electronic device, comprising: a sound player; a microphone, which is used for receiving a sound message; an audio signal processing unit, which is electrically connected to the sound player and the microphone, the audio signal processing unit comprising: a sound analysis module, which is used for analyzing the sound message to determine whether the sound message is a voice message; wherein the sound analysis module comprises: a segment cutting unit, which is used for cutting the sound message into a plurality of sound segments; and a vowel checking unit, which is used for checking whether one of the plurality of sound segments is a vowel segment and detecting that the sound message is a voice message when it is determined that one of the sound segments is a vowel segment and a control module, which is signally connected to the sound analysis module and used for controlling the sound player to stop playing sound or to lower the volume of the sound when the sound analysis module determines that the sound message is a voice message.

4. The electronic device as claimed in claim 3, wherein after controlling the sound player to stop playing sound, the control module is further used to control the sound player to play the sound message.

\* \* \* \* \*